July 7, 1964   M. L. QUINTEL ETAL   3,139,689
TESTING
Filed Nov. 6, 1962   2 Sheets-Sheet 1
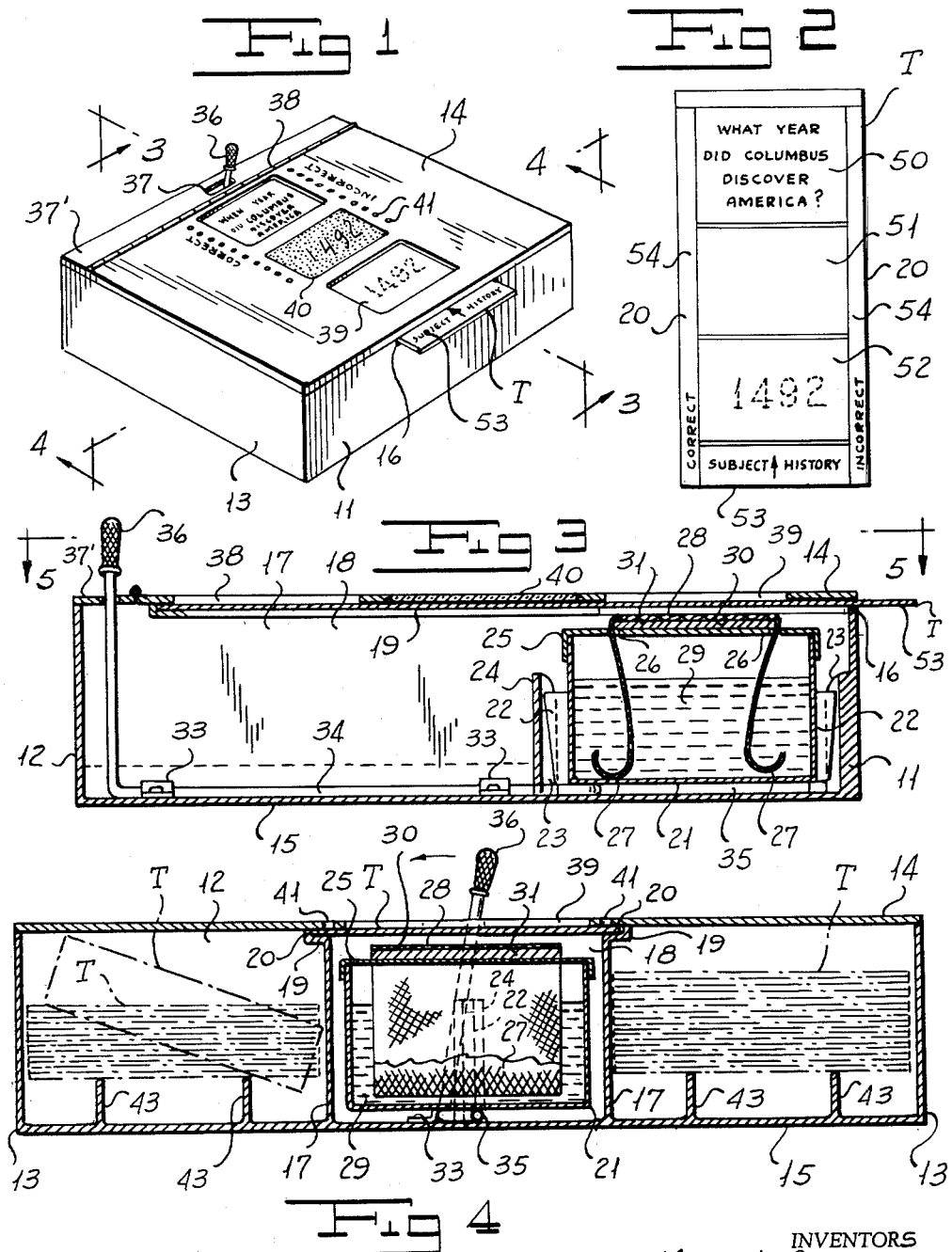
INVENTORS
MARIE L. QUINTEL &
CARL WEISS
BY
ATTORNEY

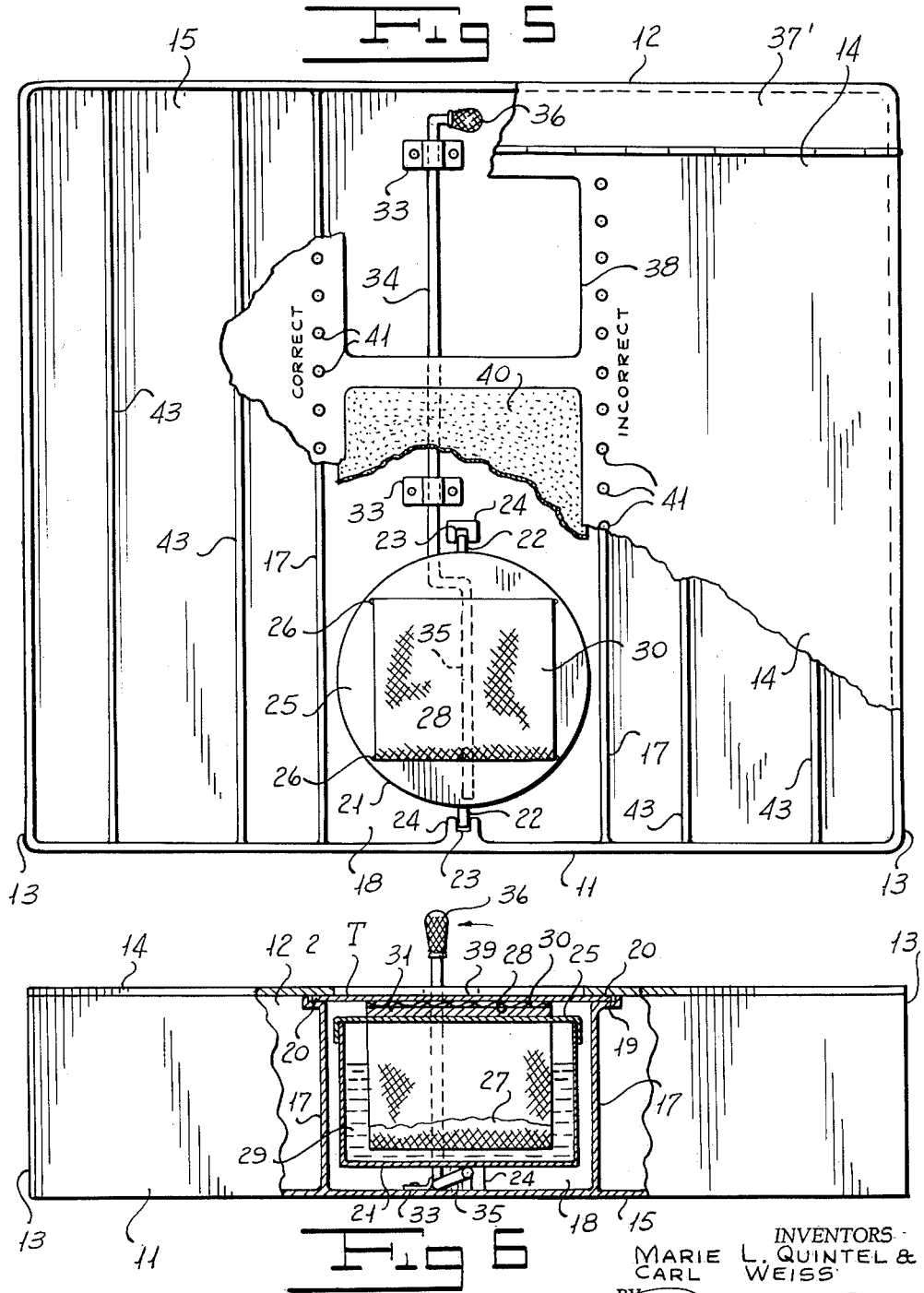

3,139,689
TESTING

Marie L. Quintel, 125—10 Queens Blvd., Kew Gardens 15, N.Y., and Carl Weiss, Wantagh, N.Y.; said Weiss assignor to said Quintel
Filed Nov. 6, 1962, Ser. No. 235,757
7 Claims. (Cl. 35—9)

Our invention relates to means for testing the intelligence of a participant by the latter's response to propounded interrogatory matter.

One of the objects of our invention is to provide means for propounding interrogatory matter to a participant for response and subsequently indicating the correctness of the response.

Another object of our invention comprehends the utilization of the foregoing described means either as an educational, amusement or advertising medium.

Still another object of our invention is to provide means of the foregoing described character wherein a card or the like is employed and on which card interrogatory matter is clearly disclosed for an answer by a participant together with a correct and normally invisible answer capable of being subsequently rendered visible to denote the correctness of the participant's answer.

A further object of our invention is to provide a card of the foregoing described character equipped with areas wherein the response or answer to the interrogatory matter may be noted with respect to correctness and incorrectness.

Another further object of our invention is to provide a device or case in which a card of the foregoing described character may be employed and which case is provided with windows for exposing the interrogatory and answer zones of the card, respectively, together with an area on which the answer by the participant may be noted.

A still further object of our invention is to provide a case of the foregoing character equipped with means for subjecting the answer zone of the card to a moisturizing or liquid treatment to render the answer visible.

An important object of our invention is to provide a case of the foregoing described character capable of use in connection with a plurality of cards which may relate to a single or plurality of subjects embraced by the interrogatories.

Another important object of our invention is to provide means comprehending the use of a plurality of cards in combination with a case for receiving the cards in such a manner that the participant or operator may cause the solution or answer to appear at a desired time.

A further important object of our invention is to provide means, including the combination of the foregoing described card and case, which is simple in construction, durable in use, efficient in operation, economical in manufacture, and capable of utilization by children as well as adults.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

FIGURE 1 is a perspective view of a case illustrating a card inserted therein for use;

FIGURE 2 is a plan view of one of the cards;

FIGURE 3 is a detail sectional view, on an enlarged scale, taken on the line 3—3 of FIGURE 1;

FIGURE 4 is a sectional view taken on the line 4—4 of FIGURE 1;

FIGURE 5 is a top plan view of the case, the top wall being partly broken away for clarification; and FIGURE 6 is a view similar to FIGURE 4 but illustrating the receptacle in a raised position.

In practicing our invention, as illustrated in FIGURES 1 to 5 of the drawings, we employ a case having front, rear, side, top, and bottom walls, 11, 12, 13, 14, and 15, respectively, with the front wall 11, adjacent the top wall 14, being formed with a card receiving slot 16 in which is inserted a testing member or card T. Interiorly, the case is also provided with a pair of spaced vertical lengthwise extending partitions 17 coacting with the side walls 13 to define lateral compartments 18. The partitions have their upper ends laterally and outwardly offset and coact with the top wall 14 to provide seats 19, subjacent the top wall, in which are accommodated the side margins 20 of the card T.

Adjacent the front wall 11, between the partitions 17, the case is provided with a well or receptacle 21 equipped with a pair of oppositely disposed outwardly and vertically extending ribs 22 slidably mounted within grooves 23 of retainers 24 secured to the case to permit vertical movement of the receptacle 21 and preclude rotation thereof. The receptacle 21 is closed by a cover 25 formed with a pair of spaced openings or slits 26 through which depend the end sections 27 of a wick 28 into liquid 29, for instance, water, contained within the receptacle for maintaining the wick in a moistened or wet condition. The intermediate section 30 of the wick 28, between the end sections 27, is supported in a relatively flat condition by a plate or anvil 31 carried by the cover 25 between the openings 26.

Pivotally mounted within and on the bottom wall of the case, by means of bearing brackets 33, is a longitudinally extending rod 34 having an offset front end portion 35 disposed under the receptacle whereby rotational movement of the rod 34 will effect raising and lowering of the receptacle, the opposite end of the rod being formed with a right-angular upwardly extending handle 36 projecting through an elongated slot or opening 37 in the top wall 14. By actuating the rod 34, through the medium of the handle 36, the receptacle may be raised and lowered relative to the top wall of the case for a purpose hereinafter made apparent.

The top wall 14 of the case, adjacent the rear wall 12, is hinged to a section 37 fixed to the case thereby permitting the top wall to be raised to permit access to the interior of the case. The top wall is provided with a pair of longitudinally aligned spaced windows or openings 38 and 39, respectively, overlying a card T and, when inserted in the case intermediate said openings, with an answer area 40, of the same or more suitable material, for instance, ground glass or the like, on which answers or solutions to interrogatory matter may be written or inscribed by a participant. Adjacent the sides of the windows 38 and 39 and the area 40, the top wall is provided with a plurality of lengthwise extending rows of openings 41 in which the point of a pencil or the like may be readily inserted for marking the card and scoring the answers thereon, the rows being denoted as correct and incorrect, respectively.

Within the compartments 18, the case is formed with pairs of longitudinally extending ribs 43 on which decks of the cards T are stacked, one compartment containing cards for use and the other for cards after use. The ribs 43 are of a height and arranged inwardly of the partitions and side walls sufficient distances to enable pressure to be applied to the side of a deck to effect lateral tilting thereof and thus facilitate ready removal of cards from a particular compartment.

Each of the cards T is constructed of a moisture pervious material and provided with interrogation, intermediate, and solution zones 50, 51, and 52, respectively. The interrogation zone 50 has clearly displayed thereon interrogatory matter for posing to a participant for an answer or solution. The intermediate zone 51 may be plain or contain extraneous matter, for instance, an advertisement. The zone 52 contains the correct answer or solution posed by the interrogatory matter disclosed in zone 50, the correct answer or solution being applied to the zone 52 by a normally invisible substance, for instance, a diluted lacquer or, what is commonly known as, "invisible ink." Inasmuch as the substance is absorbed by and of the same shade of coloring as the card, it is only rendered visible when a treatment or means is employed to obtain a distinct contrast between the substance and the card, for instance, by moisture or liquid applied to the zone 52 as hereinafter more fully described.

The card is of a sufficient length to extend outwardly of the case, adjacent the zone 52, to provide a tab 53 or the like to facilitate insertion of the card into and removal from the case and also to accommodate printed matter or the like for indicating the general subject matter to which the card pertains. Also, the margins 20 of the card may contain indicia 54 for denoting correct and incorrect answers, whereby scoring of the answers by a participant may be recorded by inserting the point of a pencil or the like in an appropriate opening 41 of the top wall to mark the particular margin.

In use, one of the cards T, which may be taken from a deck within one of the compartments, is inserted into the case through the slot 16 and supported therein by the seats 17 with the zones 50 and 52 being defined by the windows 38 and 39, respectively, of the top wall 14. When the card is thus inserted, the zone 51 is covered by the area 40 while the zone 52, viewable through the window 39, is disposed above the section 30 of the wick 28, the interrogatory matter of zone 50 being clearly discernible through the window 38 as clearly illustrated in the drawings. Upon viewing of the interrogatory matter of zone 50, the participant writes or otherwise displays the possible answer or solution to the matter on the area 40 whereupon the handle 36 is actuated to effect vertical movement of the receptacle thereby causing the intermediate section of the wick to be brought into engagement with the under face of the card subjacent the zone 52 with a resultant moistening or wetting of the card to render the correct answer or solution, contained within the zone 52, to the interrogatory matter plainly visible and permit scoring of the participant's solution as to correctness. The card is then removed from the case and by evaporation of the moisture, the correct solution is again rendered invisible thus permitting the card to be repeatedly used in the foregoing described manner. Obviously, upon the completion of a test with respect to each card, the answer or solution written or displayed on the area 40 is erased by convenient means to permit further use thereof.

From the foregoing, it will be apparent that our invention provides means whereby the knowledge or intelligence of a participant may be easily tested and that said means may be utilized either in the educational, amusement, or advertising field.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcominations.

It is obvious that the invention is not confined solely to the use herein disclosed in connection therewith as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims. It is further to be understood that the term "card" herein employed is used by way of example and is to be construed as including any means or member constructed of cardboard, plastic, paper, or sheet of any suitable relatively thin or thick material.

What is claimed is:

1. In combination, a case, a card disposed in said case and having a pair of spaced exposed zones with one of said zones being provided with interrogatory matter, said other zone being provided with normally concealed indicia constituting a correct answer to said matter and capable of being rendered visible by the application of moisture to said other zone, said case being provided with window means defining said zones to permit viewing thereof and having an area overlying said card and adapted to receive indicia indicative of a possible correct answer to said matter, said case further having a receptacle for containing a wick moisturizing liquid, a wick disposed over said receptacle and extending therein for wetting, and actuating means mounted in said case and disposed under said receptacle, said actuating means operable for raising said receptacle to dispose said wick into engagement with said other zone for moisturizing the latter and thus render said concealed indicia visible to determine thereby the correctness of an answer received on said area.

2. In combination, a case, a card disposed in said case and having a pair of spaced zones with one of said zones being provided with interrogatory matter, said other zone being provided with normally concealed indicia constituting a correct answer to said matter and capable of being rendered visible by the application of moisture to said other zone, said case being provided with windows defining said zones to permit viewing thereof and having an area overlying said card between said windows and adapted to receive indicia indicative of a possible correct answer to said matter, said case further having a receptacle for containing a wick moisturizing liquid, a wick disposed over said receptacle and extending therein for wetting, and actuating means mounted in said case and disposed under said receptacle, said actuating means operable for raising said receptacle to dispose said wick into engagement with said other zone for moisturizing the latter and thus render said concealed indicia visible to determine thereby the correctness of an answer received on said area, said case being provided with scoring means to permit marking of said card relative to the correctness of said answer received on said area.

3. A case adapted to contain a question and answer card of the type wherein the answer is normally concealed by invisible indicia contained on the card and which indicia is capable of benig rendered visible by the application of moisture to said card, said case being provided with a top provided with windows for viewing the question and answer, respectively, and equipped with means for supporting said card beneath said windows, said case being provided with indicia receiving means on which the solution to said question by a participant may be placed, and moisturizing applying means disposed in said case below said card and including actuating means operable for raising said applying means into engagement with said card for moisturizing the latter to render said answer visible whereby a comparison between said answer and said solution may be made.

4. A case adapted to contain a question and answer card of the type wherein the answer is normally concealed by invisible indicia contained on the card and which indicia is capable of being rendered visible by the application of moisture to said card, said case being provided with a top provided with windows for viewing the question and answer, respectively, and equipped with means for supporting said card beneath said windows, said case being provided with indicia receiving means on which the solution to said question by a participant may be placed, a receptacle for containing a moistening liquid arranged under said card, a wick disposed over said receptacle and extending therein for wetting, actuating means mounted in said case under said receptacle and being operable for raising said receptacle to dispose said wick into engagement with said card for moisturizing the latter to render said answer visible whereby a comparison between said answer and said solution may be made.

5. A case adapted to contain a question and answer card of the type wherein the answer is normally concealed by invisible indicia contained on the card and which indicia is capable of being rendered visible by the application of moisture to said card, said case being provided with a top provided with windows for viewing the question and answer, respectively, and equipped with means for supporting said card beneath said windows, said case being provided with indicia receiving means on which the solution to said question by a participant may be placed, a receptacle for containing a moistening liquid arranged under said card, a wick disposed over said receptacle and extending therein for wetting, actuating means mounted in said case under said receptacle and being operable for raising said receptacle to dispose said wick into engagement with said card for moisturizing the latter to render said answer visible whereby a comparison between said answer and said solution may be made, said top having openings permitting access to said card for marking thereof as to the correctness of the solution.

6. In combination, a case, a reusable testing member disposed in said case and having spaced and simultaneously fully exposed zones, one of said zones being provided with normally invisible indicia capable of being rendered visible by a pre-established treatment applied to said one zone and invisible after said treatment, said other zone being provided with permanent visible indicia correlated with said invisible indicia, said case being provided with openings defining said zones to permit simultaneous full viewing thereof and having an exposed area adapted to receive indicia of a possible like character as the invisible indicia, and treatment applying means disposed within said case and operable for applying said treatment to said one zone to render said invisible indicia visible for comparison with indicia on said area and for terminating said treatment whereby said indicia of said one zone is rendered invisible to condition said member for reuse.

7. In combination, a case, a reusable testing member disposed in said case and having spaced and simultaneously fully exposed zones, one of said zones being normally dry and provided with invisible indicia capable of being rendered visible by moisture applied to said one zone and invisible upon said one zone becoming dry, said other zone being provided with permanent visible indicia correlated with said invisible indicia, said case being provided with openings defining said zones to permit simultaneous full viewing thereof and having an exposed area adapted to receive indicia of a possible like character as the invisible indicia, and moisture applying means disposed within said case and operable for applying said moisture to said one zone to render said invisible indicia visible for comparison with indicia on said area and for terminating said application to permit drying of said one zone and thus render said indicia of said one zone invisible whereby to condition said member for reuse.

References Cited in the file of this patent
UNITED STATES PATENTS

| 1,500,777 | Stevenson | July 8, 1924 |
| 1,884,197 | Peterson et al. | Oct. 25, 1932 |
| 2,169,266 | Matter | Aug. 15, 1939 |
| 2,178,906 | Haumerson | Nov. 7, 1939 |

OTHER REFERENCES

"Printing Inks," Ellis, Reinhold Publishing Co., New York city, copyright 1940 (pages 403–404 relied on).